Dec. 29, 1931.   A. H. KING ET AL   1,838,408
INTERNAL COMBUSTION ENGINE
Filed June 5, 1928   5 Sheets-Sheet 1

Inventors
ALEXANDER H. KING
EARLE A. RYDER

By
Attorney

Dec. 29, 1931.  A. H. KING ET AL  1,838,408
INTERNAL COMBUSTION ENGINE
Filed June 5, 1928   5 Sheets-Sheet 2

Inventors
ALEXANDER H. KING
EARLE A. RYDER
By
Attorney

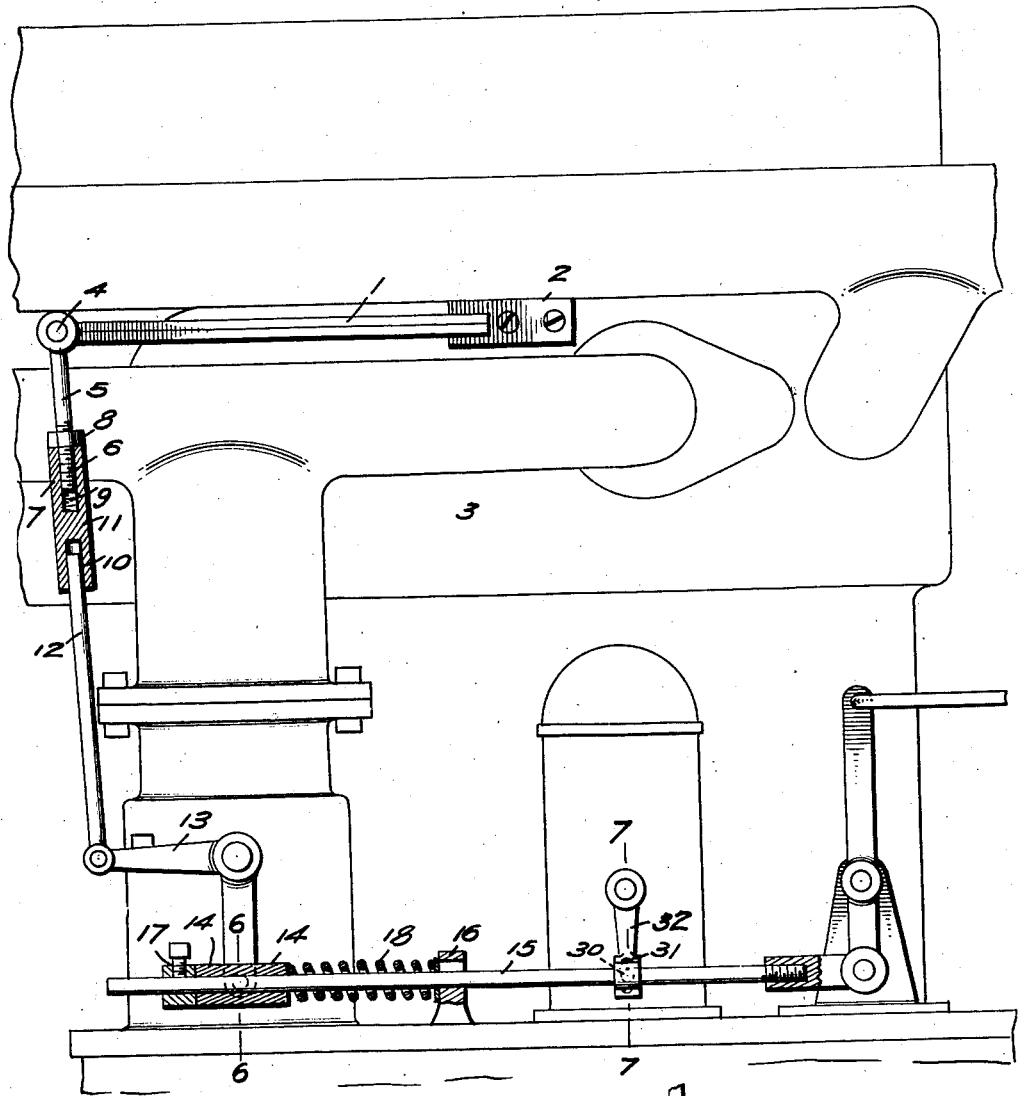
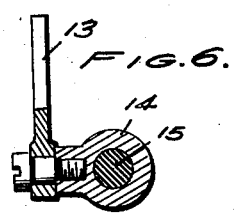
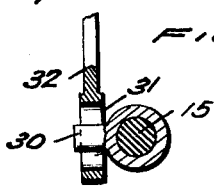

Dec. 29, 1931.    A. H. KING ET AL    1,838,408
INTERNAL COMBUSTION ENGINE
Filed June 5, 1928    5 Sheets-Sheet 4
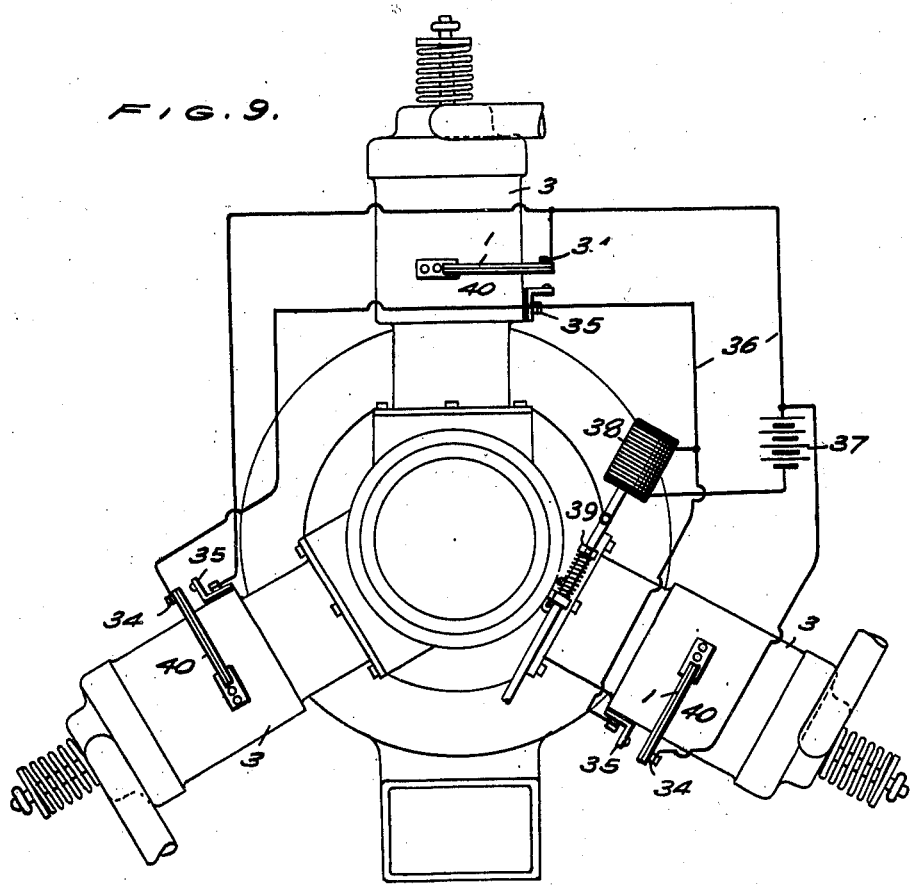
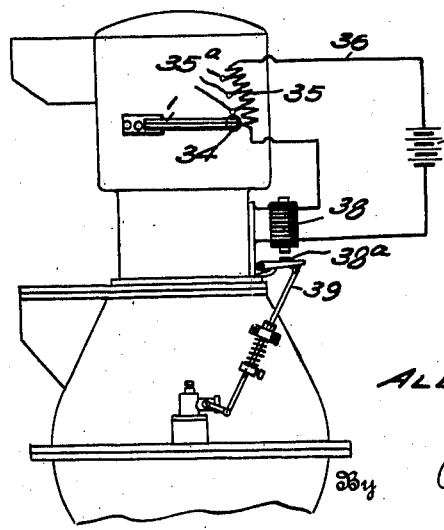
Inventors
ALEXANDER H. KING
EARLE A. RYDER
By
Attorney Dec. 29, 1931.  A. H. KING ET AL  1,838,408
INTERNAL COMBUSTION ENGINE
Filed June 5, 1928  5 Sheets-Sheet 5

Inventors
ALEXANDER H. KING
EARLE A. RYDER
By
Attorney

Patented Dec. 29, 1931

1,838,408

UNITED STATES PATENT OFFICE

ALEXANDER H. KING AND EARLE A. RYDER, OF WEST HARTFORD, CONNECTICUT, ASSIGNORS TO THE PRATT & WHITNEY AIRCRAFT COMPANY, OF HARTFORD, CONNECTICUT

INTERNAL COMBUSTION ENGINE

Application filed June 5, 1928. Serial No. 283,081.

This invention relates in general to internal combustion engines and is more particularly concerned with thermostatic controls governing the operation of the same between certain ranges of cylinder temperature.

Internal combustion engines have a tendency to overheat under conditions of excess load, incorrect carburetion due to the use of low grade fuels or improper adjustment of fuel proportions, incorrect spark timing and other adverse conditions. Such conditions frequently cause detonation, which in turn causes further overheating, poor lubrication, loss in output of horsepower and the final seizing of the pistons within their cylinders and the destruction of the engine.

It is well recognized that failure of an engine by overheating is due to excessive temperature of the cylinder head or cylinder walls, and this excessive temperature may be caused either by high combustion temperature, deficiency of the cooling system, or a condition such as detonation, which causes a disproportionate part of the heat of combustion to be transferred to the cylinder walls.

The prior art contains efforts to regulate engine temperatures by control of the cooling means, as for example, thermostatic control of the cooling water circulation. Such means are effective to maintain a certain minimum temperature which may be desirable for proper operation, but are powerless to limit the maximum temperature of the combustion chamber or cylinder whenever the conditions of operation cause the evolution and transfer to the cylinder walls of more heat than the cooling system is capable of carrying away.

In order to remove the danger which might otherwise arise from excess loads, poor fuel selection, improper spark timing, deficiency of the cooling system, or other causes of overheating, it is the purpose of this invention to provide a means, governed by cylinder temperature, for controlling the amount of heat supplied to the cylinder walls. In general, any control is effective which operates to reduce the pressure, and/or temperature of combustion; or to prevent detonation if conditions likely to cause detonation are present. Combustion temperature may be lowered and detonation, if any, reduced by closing the throttle, retarding the spark or enriching the fuel mixture and therefore it is an object of this invention to provide a means governed by cylinder temperature for controlling, within certain bounds, the setting of the throttle, the spark timing, the mixture strength or any combination of said controls.

It is not necessary for the temperature responsive means to be in actual contact with the cylinder or combustion chamber, since an excessive heating of these parts will be reflected in a rise in temperature elsewhere. Thus, the oil which falls from the cylinder walls acquires a temperature similar to that of said walls, and a thermostat heated by this oil will accomplish the above-mentioned control. In like manner, the cooling water in a cooling system of substantially fixed capacity will promptly reflect an increase in cylinder wall heat and can be utilized as a medium for the operation of a thermostat for the uses specified.

It is the prime object of our invention to position a thermostat at a point vitally affected by overheating, such as on, or adjacent to, the head or barrel of one of the engine cylinders, and to connect the same by either mechanical or electrical means to the engine controls, either the spark control or the throttle control, or both, in such a manner that excessive cylinder temperatures will result in the required movement of such controls to the effect that destructive temperatures will be avoided.

It is another object of our invention to provide means permitting adjustability in the connections between the thermostat and the engine controls to permit the same to be rendered effective, or ineffective, as the case may be, at certain points as desired in the temperature range.

Other objects of this invention will appear in the accompanying specification and claims and will be disclosed in the accompanying drawings in which—

Figure 5 is a side elevation of a portion of an internal combustion engine showing the invention as controlling both the spark and throttle control members;

Figure 6 is a detail in section along the lines 6—6 of Figure 5;

Figure 7 is a detail in section along the lines 7—7 of Figure 5;

Figure 8 is an end elevation of a cylinder showing our thermostat and means for electrically controlling the movement of the engine controls under influence of the movement of the thermostat;

Figure 9 is an end elevation of a radial engine in which each of the cylinders is provided with a thermostat, the thermostats being connected in parallel and operating to actuate the engine controls when the temperature of any one cylinder becomes excessively high. The showing is, to a certain extent, diagrammatic;

Figure 1:
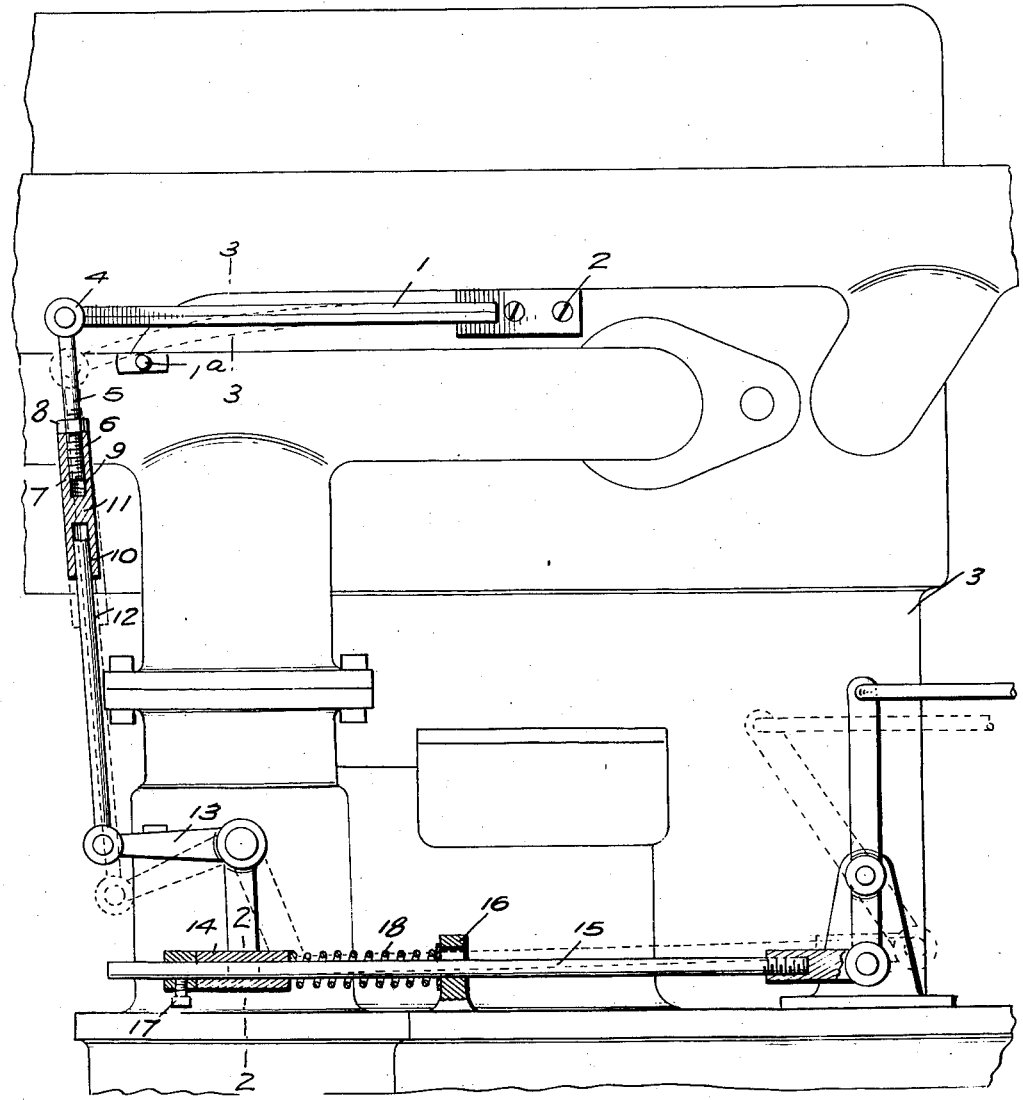
Figure 1 is a side elevation of a portion of an internal combustion engine embodying our invention as applied to the throttle control of the engine, parts of the device being shown in section.
Figure 2:
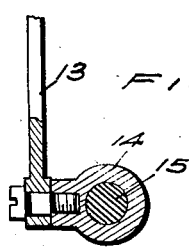
Figure 2 is a detail in section on the line 2—2 of Figure 1.
Figure 3:
Figure 3 is a detail in section on the line 3—3 of Figure 1, and discloses our preferred type of thermostatic control.

Referring now with greater particularity to the drawings and having reference, first, to Figures 1, 2 and 3, it will be seen that our device is comprised as follows.

A thermostat 1, preferably, though not necessarily, comprised of two dissimilar metals having different coefficients of expansion and welded or riveted together, is secured by any suitable means such as is illustrated at 2, to the cylinder 3 of the engine at a point at, or adjacent to, the head of the said cylinder. At its free end the thermostat is connected to a fitting 4 pivotally connected to a control rod 5. The lower end 6 of the rod 5 screw-threadedly engages in and with the upper bore 9 of a gland 7, being adjustably positionable therein, and being provided with a nut 8 for locking the same in any position to which it has been adjusted. A lower and smooth bore 10 in the gland 7 is spaced from the bore 9 by the material at 11 and is adapted to receive, slidably, the control rod 12. The control rod 12, at its lower end, is pivotally connected to the end of a bell crank lever 13, the other end of which is pivotally connected to a permissive link 14 yieldably connected to the throttle rod 15. The bell crank lever 13 controls the setting of the throttle valve of the carburetor. The permissive link 14 is adjustably mounted on main throttle control rod 15 by means of stops 16 and 17, being slidable on the rod 15 and being urged toward the stop 17 by means of a compression spring 18.

The gland 7 is adjusted to such a position that the upper end of the rod 12 fails to reach the upper end of the bore 10 when the engine is cold. The amount of the gap left is dependent upon the temperature range designed to be permitted before the thermostat, moving to such a position as is shown in dotted lines in Figure 1, will cause the upper end of the rod 12 to contact with the upper end of the bore 10 so that further downward movement of the free end of the thermostat will result in partial closing of the throttle. A stop 1a is provided to limit the active range of the thermostat 1, so as to prevent excess closing action on the throttle as emergencies may require that the full power be had momentarily even at the expense of temporary overheating.

Figure 4:
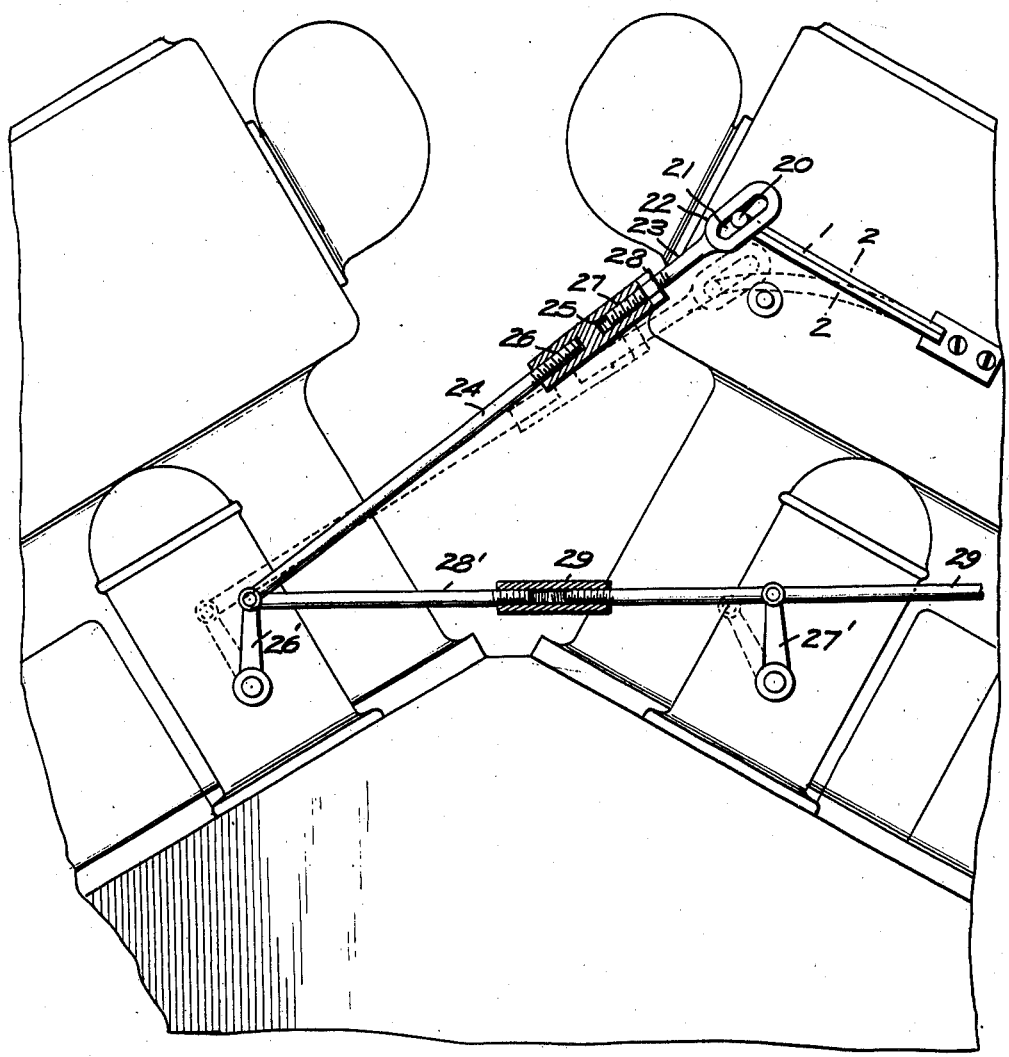
Figure 4 is an end elevation of a V-type internal combustion engine showing our invention as applied to the spark control of the said engine, parts of the improvement being shown in section.

Having reference now particularly to Figure 4, it will be seen that we have fixedly or integrally attached a pin 20 to the free end of the thermostat 1 and have so arranged our device that this pin is adapted to travel in a slot 21 in the upper portion 22 of a spark setting control rod 23. This rod is comprised of two principal parts 23 and 24 adjustably securable to each other by a gland 25 having oppositely threaded screw-threaded bores 26 and 27. A lock nut 28 is provided to hold the rod parts in any position to which they may have been adjusted.

The lower rod 24 is pivotally connected at its lower end to the spark lever 26' which in turn is pivotally connected to its companion spark lever 27' by means of rod 28'. The rod 28' is pivotally connected to the hand spark control 29. It will be noted that the effective length of the composite rod 23—24 may be adjusted by means of the gland 25 and so vary the setting at which the pin 20 will reach the bottom of the slot 21 and hence the temperature setting beyond which the thermostat will cause a retarding of the spark. The movement of the parts is shown in dotted lines as illustrating the action of the thermostatic control under excessive temperatures. The rod 28 has a gland 29 to adjust the relative settings of the spark control to the cylinders as shown.

In Figures 5, 6 and 7 we have disclosed our device as applied to both the throttle and the spark control. In these figures the structure is substantially the same as that shown in Figure 1 with the exception that, to the right of the permissive link 14 we have disclosed the rod 15 as also connected, by means of pin 30 and slot 31 to the spark control rod 32. In this instance the spark and throttle are movable in unison whether the movement is due to manual or to thermostatic control. Obviously they may be separately controlled, as for instance, the pivot pin of the fitting 4, as shown in Figure 1, may be extended to form the pin 20 of Figure 4. Or separate thermostats for the two controls may be used without departing from the spirit of our invention and the two thermostats may be arranged so as to become effective at different points in the temperature range.

Figure 12:
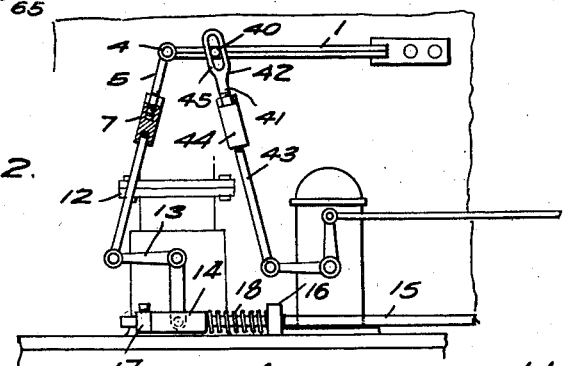
Figure 12 is a view similar to that of Figure 5 showing a modification of my combined throttle and spark control.

In Figure 12 we have disclosed a modification of the structure shown in Figure 5. In the structure of Figure 5 the thermostat acts to cause a retarding of the spark and throttle controls simultaneously. The movements of these two controls begin and end at the same time and they are actuated to substantially the same extent. In Figure 12 we have shown the thermostat 1 as controlling the throttle exactly as disclosed in Figure 1. Intermediate of the ends of the thermostat we have provided a pin 40 extending laterally of the thermostat. A two part rod 41, having upper and lower portions 42 and 43, respectively, and adjustable as to length by means of a connecting gland 44, has, at its upper end an elongated eyelet 45 in which the pin 40 travels. The rod 43 is pivotally connected at its lower end to a bell crank lever 46 which operates the spark advance setting. This structure, on account of the elongation of the eyelet 45, permits the throttle to be retarded to a considerable extent while the spark is still fully advanced. This is the preferred structure of a combined spark and throttle thermostatically operated control since the engine will usually operate at greater efficiency with a fully advanced spark even though the throttle is slightly retarded.

Figure 10:
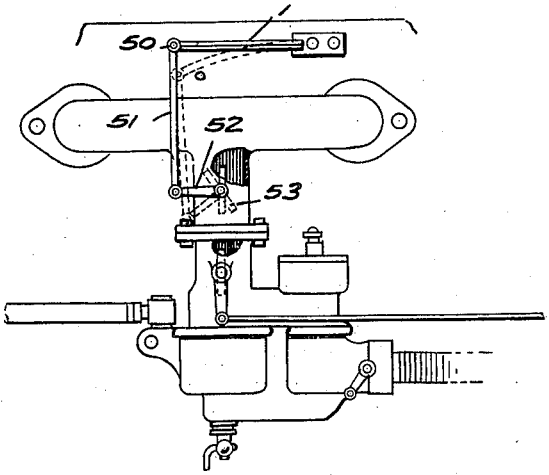
Figure 10 is a view similar to Figure 1 showing my thermostat as operating a supplemental throttle.

In Figure 10 we have disclosed the thermostat 1 as being pivotally connected at 50 to a rod 51 which is, in turn, pivotally connected to a lever 52 for operating a supplemental throttle control 53.

Figure 11:
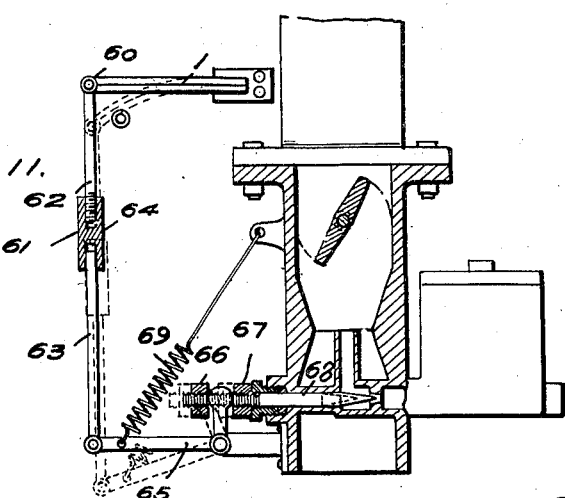
Figure 11 is a view, partly in vertical section, illustrating my thermostatically controlled mixture control means.

In Figure 11 we have disclosed the thermostat 1 as being pivoted at 60, to a two part rod 61, comprised of upper end lower portions 62 and 63, and adjustable as to length by means of gland 64. The lower bore of gland 64 slidingly receives the rod part 63 and is so arranged as to permit a certain degree of movement of the rod portion 62 before any movement of the rod portions 63 begins. The lower end of the rod 63 is pivotally connected to one end of a bell crank lever 65. The other end of the bell crank lever 65 is ball shaped and lies between two adjustable stops 66 and 67 on a mixture control needle valve rod 68. From the drawings it will be seen that overheating will tend to cause the movement of the needle valve in the direction of the positions shown in dotted lines, thus enriching the mixture and reducing the tendency of the engine to overheat. A spring 69 is provided to return the needle valve to its proper adjusted position when the thermostat is returned to its position under normal temperatures.

Instead of the mechanical means for operatively connecting the thermostat or thermostats to the motor controls, electrical means, or electrical means controlling any secondary motive power may be used. In Figure 8 we have disclosed such an apparatus. In this structure an electrical contact 34 is secured to the free end of the thermostat 1. A rheostat 35, having a plurality of contacts 35a, is fixed to but insulated from the engine cylinder, the contacts 35a being adapted to be engaged successively by the contact 34 upon an excessive rise in cylinder temperature. These contacts form the terminals of an electrical circuit which includes the leads 36, a source of electrical energy illustrated as a battery at 37, and a solenoid 38. In the figure shown, the solenoid armature 38a is shown as mechanically connected to an engine control rod 39 which may be for the throttle control, the mixture control, the spark control, or any combination of the three. If it is desired a relay may be substituted for the solenoid and the relay be used for controlling the operation of any additional power means for operating either of the three engine control hereinabove described.

In Figure 9 we have indicated a plurality of thermostatic controls 36 similar to those shown in Figure 8 and have connected the same in parallel so that the control will be actuated in accordance with the temperature of the hottest cylinder. In this case either the solenoid or relay 34 as shown and described in Figure 8 may be used, but as shown, the rheostat is dispensed with and the contact is either made or broken providing either full retarding, within the limits of the thermostat, or none at all.

It is believed that the description of the operation of our device has proceeded with the description of the structural details thereof to the extent that it will be clearly understandable to any person skilled in the art to which this invention relates. By the generic term "engine operating controls" as it appears in the claims accompanying this specification, we mean those controls which normally govern its operation characteristics as distinguished from such devices as starting and stopping switches, shutter controls, variable oil pressure regulating devices and the like. Rather this term refers to the spark, throttle, and fuel mixture controls taken separately or in any combination thereof.

Having thus described our invention what we claim is—

1. In combination, with a multicylindered internal combustion engine, and the usual manually controlled operating controls therefor, a thermostat, and means operatively connecting said theremostat to said controls to move said controls in such a manner as to reduce the effective combustion pressure within the cylinders of said engine when the said engine overheats.

2. In combination, with an internal combustion engine, and the usual manually controlled operating controls therefor, a thermostat, and means operatively connecting said thermostat to said controls to move said controls in such a manner as to reduce the effective compression pressure within the cylinders of said engine when the said cylinders overheat, said thermostat being ineffective until a predetermined cylinder temperature has been reached.

3. In combination, with an internal combustion engine having a plurality of cylinders, engine operating controls for said engine, a thermostat mounted in thermal connection with the head of one of said cylinders, means for operatively connecting said thermostat to said engine controls to move said controls, said means being formed to permit of normal temperature increases without affecting said engine controls.

4. In combination, with an internal combustion engine having a plurality of cylinders, engine operating controls for said engine, a thermostat mounted in thermal connection with the head of one of said cylinders, means for operatively connecting said thermostat to said engine controls to move said controls, said means being formed to permit of normal temperature increases without affecting said engine controls, but operating to actuate the same when the cylinder reaches excessive temperatures.

5. In combination, with an internal combustion engine having a plurality of cylinders, engine operating controls for said engine, a thermostat mounted in thermal connection with the head of one of said cylinders, means for operatively connecting said thermostat to said engine controls to move said controls, said means being formed to permit of normal temperature increases without affecting said engine controls, but operating to actuate the same when the cylinder reaches excessive temperatures, and means for adjusting the said last named means to vary the point at which it becomes effective upon the engine controls.

6. In combination with a combustion chamber, manually operated combustion operating controls, and means responsive to the temperature of said chamber and operating to actuate said controls to control the combustion pressure therein.

7. In combination with a combustion chamber, manually operated combustion operating controls, and means responsive to the temperature of said chamber and operating to actuate said controls to control the temperature thereof.

8. In combination, with a multicylindered internal combustion engine and operating controls therefor, a thermostat, and means operatively connecting said thermostat to said controls to move said controls in such a manner as to reduce the effective combustion pressure within the cylinders of said engine when the said engine overheats, said means including an element providing for lost motion in the connecting train to prevent movement of the engine control until a predetermined temperature is reached.

9. In combination, with a multicylindered internal combustion engine and operating controls therefor, a thermostat, and means operatively connecting said thermostat to said controls to move said controls in such a manner as to reduce the effective combustion pressure within the cylinders of said engine when the said engine overheats, said means including an element providing for lost motion in the connecting train to prevent movement of the engine control until a predetermined temperature is reached, and means for adjusting the effective position of said element.

10. In combination, with an internal combustion engine having an engine throttle control and spark adjusting control, a thermostat mounted on said engine and in thermal communication therewith, and means operatively connecting said thermostat and said controls to actuate the latter when the temperature of said engine reaches a predetermined degree.

11. In combination, with an internal combustion engine having an engine throttle control and a spark adjusting control, a thermostat mounted on said engine and in thermal communication therewith, and means operatively connecting said thermostat and said controls, said means being formed to permit of normal temperature increases without affecting said controls, but operating to actuate the same when the engine temperature reaches a predetermined degree.

12. In combination, with an internal combustion engine having an engine throttle control and a spark adjusting control, a thermostat mounted on said engine and in thermal communication therewith, and means operatively connecting said thermostat and said controls, said means being formed to permit of normal temperature increases without affecting said controls, but operating to actuate the same when the engine temperature reaches a predetermined degree, and means for adjusting said connecting means to vary the point at which said thermostat becomes effective upon said controls.

13. In combination, with an internal combustion engine having an engine throttle control and a spark adjusting control, a thermostat mounted on said engine and in thermal communication therewith, and means operatively connecting said thermostat and said controls, said means being formed to permit of normal temperature increases without affecting said controls, but operating to actuate the same when the engine temperature reaches a predetermined degree, and means for adjusting said connecting means to vary the point at which said thermostat becomes effective upon each of said controls.

14. In combination, with an internal combustion engine having an engine throttle control and a spark adjusting control, a thermostat mounted on said engine and in thermal communication therewith, and means operatively connecting said thermostat and said controls, said means being formed to permit of normal temperature increases without affecting said controls, but operating to actuate the same when the engine temperature reaches a predetermined degree, and individual means for adjusting said connecting means to vary the point at which said thermostat becomes effective upon each of said controls.

In testimony whereof we affix our signatures.

ALEXANDER H. KING.
EARLE A. RYDER.